United States Patent [19]

Ginster

[11] Patent Number: 5,027,556
[45] Date of Patent: Jul. 2, 1991

[54] WINDOW SEALING AND GUIDING ARRANGEMENTS

[75] Inventor: Helmut Ginster, Viersen, Fed. Rep. of Germany

[73] Assignee: Draftex Industries Limited, Edinburgh, Scotland

[21] Appl. No.: 538,922

[22] Filed: Jun. 15, 1990

[30] Foreign Application Priority Data

Jun. 22, 1989 [GB] United Kingdom ............... 8914301

[51] Int. Cl.⁵ .............................................. E05D 15/16
[52] U.S. Cl. .......................................... 49/441; 49/495
[58] Field of Search ................. 49/440, 441, 484, 485, 49/486, 488, 489, 490, 495, 502, 374

[56] References Cited

U.S. PATENT DOCUMENTS

| 2,772,915 | 12/1956 | Renno | 49/495 X |
| 2,912,727 | 11/1959 | Sehn | 49/495 X |
| 3,155,420 | 11/1964 | Belsky | 49/495 X |
| 3,479,768 | 11/1969 | Smadja | 49/441 |
| 4,348,046 | 9/1982 | Ohya | 49/502 X |
| 4,607,879 | 8/1986 | Mori et al. | 49/490 X |
| 4,653,230 | 3/1987 | Seo et al. | 49/374 X |

FOREIGN PATENT DOCUMENTS

| 350848 | 7/1989 | European Pat. Off. | 49/502 |
| 296617 | 9/1928 | United Kingdom | 49/441 |
| 821193 | 9/1959 | United Kingdom | 49/495 |

Primary Examiner—Rodney M. Lindsey
Assistant Examiner—Jerry Redman
Attorney, Agent, or Firm—Leydig, Voit & Mayer

[57] ABSTRACT

A pillar for dividing the window frame carried by a vehicle door into a small part incorporating a fixed pane of window glass and a large part incorporating a vertically slidable pane of window glass comprises a metal strut supporting an extruded plastics or rubber part. The latter defines vertical channels for respectively receiving the fixed and slidable window panes. The central portion of the plastics or rubber part covers the surface of the strut facing outwardly of the vehicle and is on the same order of thickness as each of the window panes, thus giving a "flush glass" effect. It is reinforced by an embedded metal strip. The surface of the strut which faces inwardly of the vehicle is exposed and may be painted or otherwise decorated.

9 Claims, 2 Drawing Sheets

WINDOW SEALING AND GUIDING ARRANGEMENTS

BACKGROUND OF THE INVENTION

The invention relates to window sealing and guiding arrangements particularly, though not exclusively, for use in motor vehicle body construction.

SUMMARY OF THE INVENTION

According to the invention, there is provided a window sealing and guiding arrangement for supporting the edges of, and separating, two substantially parallel and aligned window panes, comprising a metal strut for extending between and separating the facing edges of the window panes, and defining first and second surfaces substantially parallel to the window panes and facing in opposite directions, and a sealing and guiding strip extending the length of and attached to the metal strut and defining first and second longitudinally extending channels for respectively receiving the said edges of the window panes, the strip covering at least one said surface.

According to the invention, there is further provided a dividing pillar for the window frame carried by the door of a motor vehicle and dividing the window into a relatively small part carrying a fixed window pane and a relatively large part receiving a window pane which is slidable within the frame in a direction parallel to the length of the pillar, comprising a metal strut for extending between and separating the facing edges of the window panes and defining two surfaces parallel to the window panes, one facing outwardly of the door and the other facing inwardly thereof, and a sealing and guiding strip made of extruded plastics or rubber material extending the length of and attached to the metal strut and having a central part which covers the surface of the strut facing outwardly of the door and which is integrally connected with two parts one on each side of the strut and which define respective channels extending longitudinally of the strut and facing away from each other and each for receiving an edge of a respective one of the window panes, the strip leaving exposed the surface of the strut facing inwardly of the door, the first part of the strip having a thickness of the same order as the thickness of each pane of glass and incorporating a completely embedded metal reinforcement which overlaps the two said channels.

DESCRIPTION OF THE DRAWINGS

Window sealing and guiding arrangements for use in motor vehicle body construction will now be described, by way of example only, with reference to the accompanying diagrammatic drawing in which.

DESCRIPTION OF THE PREFERRED EMBODIMENTS

Figure 1:
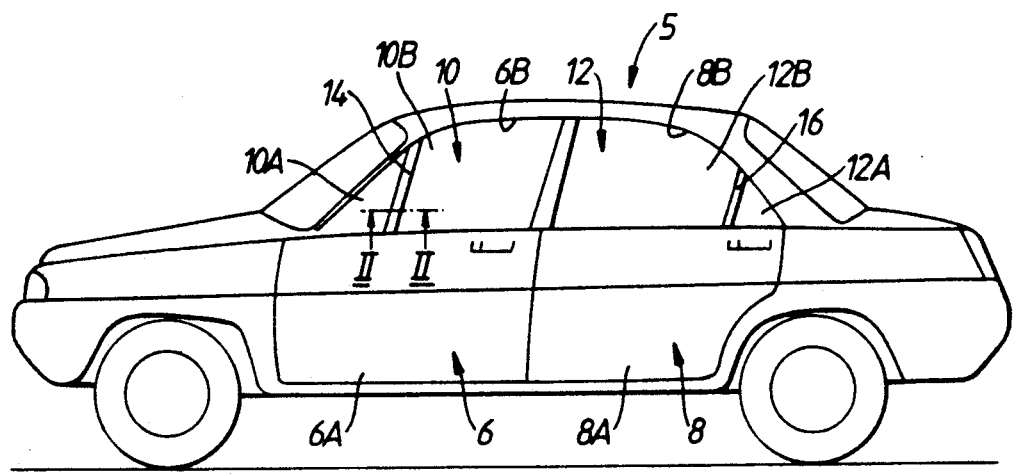
FIG. 1 is a side view of a motor vehicle body incorporating one of the sealing and guiding arrangements.

The motor vehicle 5 shown in FIG. 1 has doors 6 and 8, each having a closed-off hollow lower part 6A,8A and carrying a window frame 6B,8B defining a window opening 10,12.

As part of each window frame 6B,8B, there is provided a dividing pillar 14,16. The dividing pillars each define the respective window openings into a small part 10A,12A and a large part 10B,12B. The window glass within each small part is fixed but the window glass within each large part is raisable and lowerable.

Figure 2:
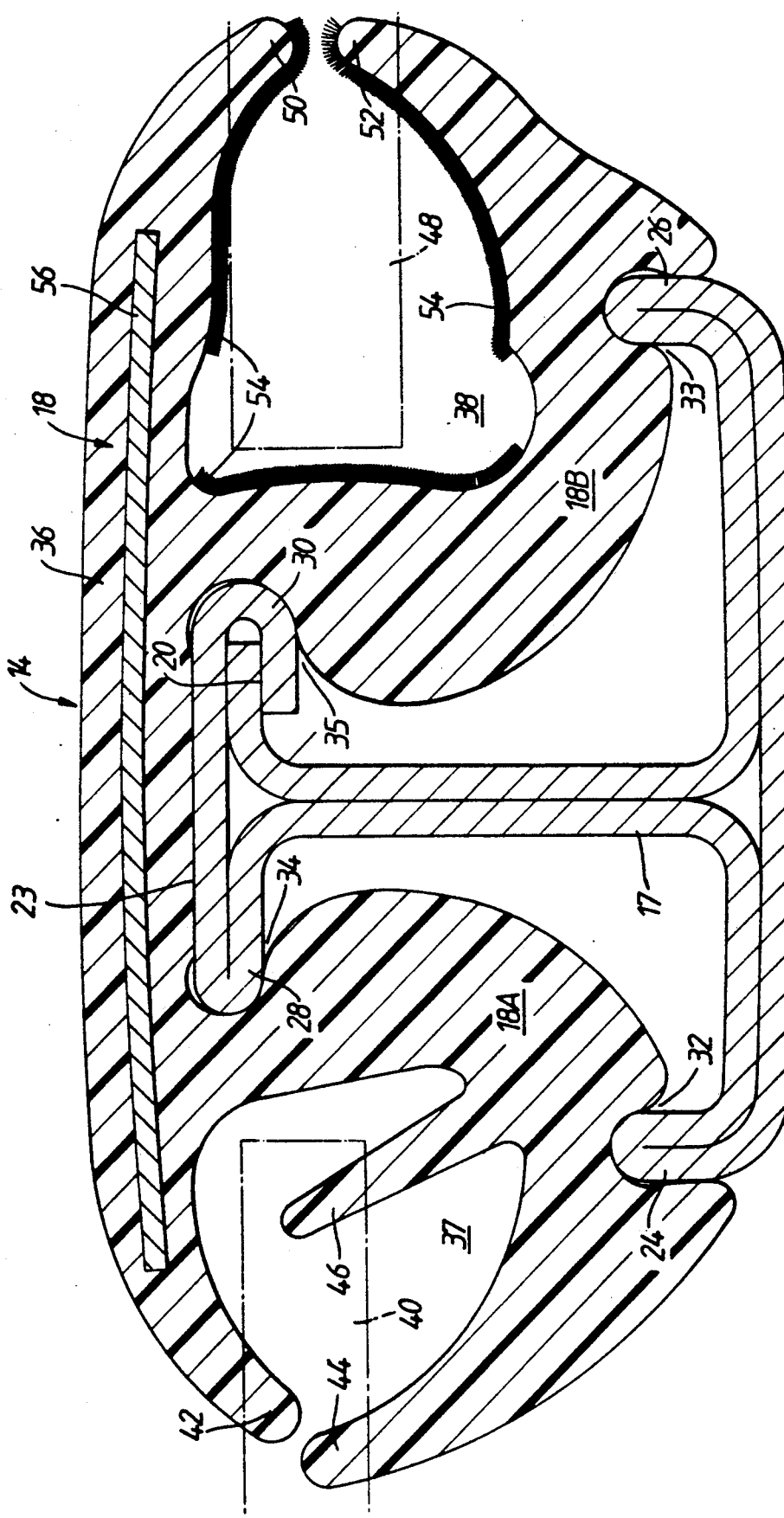
FIG. 2 is a cross-section on the line II—II of FIG. 1.

FIG. 2 shows the construction of the division pillar 14 (the division pillar 16 would be similarly constructed). As shown, it comprises a metal strut 17 supporting an extruded plastics or rubber strip 18. The metal strut 17 is made of sheet metal bent as shown and welded together at 20 to provide a strong yet thin construction having a face 22 which is exposed to the interior of the vehicle and opposite to the face 23. The design of the metal strut 17 is such as to define ribs 24,26,28 and 30 running along the full height of the pillar, and the plastics or rubber strip 18 is provided with corresponding channels 32,33,34 and 35 for locating and resiliently gripping on these ribs. The strip 18 has portions 18A and 18B on each side of the metal strut 17, these being joined together by an integral relatively thin portion 36 which is positioned on the outside of the vehicle and covers over the metal strut 17. Portions 18A and 18B each define a vertical channel 37,38. Channel 37 faces towards the fixed part 10A (FIG. 1) of the window opening and receives a fixed window glass 40. The material is extruded so as to provide flexible lips 42,44 and 46 which engage and seal against the surfaces of the window glass 40 (the latter shown dotted).

Channel 38 faces towards the openable part 10B (FIG. 1) of the window opening and receives a raisable and lowerable window glass 48 (shown dotted). The mouth of the channel 38 is defined by flexible lips 50 and 52. The inner surfaces of the channel 38 are covered with flock as shown at 54 for providing low-friction contact with the surfaces of the window glass.

A metal insert 56, running the full height of the pillar, is embedded in the central portion 36 of the flexible strip 18.

The arrangement illustrated thus provides a dividing pillar which is small in width so as to aid the driver's visibility. The strengthening metal insert 56 enables the central part of the strip 18 to be thin, so that the outside surfaces of the window glass 40,48 are substantially flush with the bodywork, giving a "flush glass" effect. The exposed inner face 22 of the metal strut 17 can be painted or otherwise decorated.

It will be understood that the strip 18 needs to be shaped so as to ensure that it grips tightly on the metal strut 17. For example, it could be secured partly by adhesive. Instead, its shape could follow (more closely than shown in FIG. 2), the profile of the metal strut.

What is claimed is:

1. A window sealing and guiding arrangement for supporting the respective facing edges of, and separating, two aligned window panes lying substantially in the same plane, comprising
    a metal strut for extending between and separating said facing edges of the window panes, and defining first and second spaced surfaces substantially parallel to the window panes and facing in opposite directions, and
    a sealing and guiding strip having a metal reinforcement, said strip extending the length of and attached to the metal strut and defining first and second longitudinally extending channels for respectively receiving the said edges of the window panes, the strip covering at least one said surface.

2. An arrangement according to claim 1, in which the portion of the strip covering the said one surface has a thickness on the same order as the thickness of each said window pane and incorporates said metal reinforcement which is embedded within the material of the strip and overlaps each said channel.

3. An arrangement according to claim 1, in which at least one of the window panes is slidable within its respective channel.

4. An arrangement according to claim 3, including low-friction material carried by the surfaces of the said one channel in contact with the sliding window pane.

5. An arrangement according to claim 1, in which one of the window panes is fixed within its respective channel.

6. A dividing pillar for the window frame carried by the door of a motor vehicle and dividing the window into a relatively small part carrying a fixed window pane and a relatively large part receiving a window pane which is slidable within the frame in a direction parallel to the length of the pillar, comprising a metal strut for extending between and separating the facing edges of the window panes and defining two surfaces parallel to the window panes, one facing outwardly of the door and the other facing inwardly thereof, and a sealing and guiding strip made of extruded plastics or rubber material extending the length of and attached to the metal strut and having a central part which covers the surface of the strut facing outwardly of the door and which is integrally connected with two parts one on each side of the strut and which define respective channels extending longitudinally of the strut and facing away from each other and each for receiving an edge of a respective one of the window panes, the strip leaving exposed the surface of the strut facing inwardly of the door, the first part of the strip having a thickness on the same order as the thickness of each pane of glass and incorporating a completely embedded metal reinforcement which overlaps the two said channels.

7. An arrangement according to claim 6, in which the channel receiving the slidable window pane has its surfaces contacting the glass covered with low friction material.

8. An arrangement according to claim 6, in which the metal strut is constructed from sheet metal which defines ribs extending the length of the strut, there being two ribs adjacent the longitudinally extending edges of each said surface of the strut, and the sealing and guiding strip defines respective channels for tightly embracing the ribs whereby the resilience of the material of the strip holds the strip in position on the strut.

9. An arrangement according to claim 6, in which the surface of the strut facing inwardly of the door is painted.

* * * * *